United States Patent Office 3,298,446
Patented Jan. 17, 1967

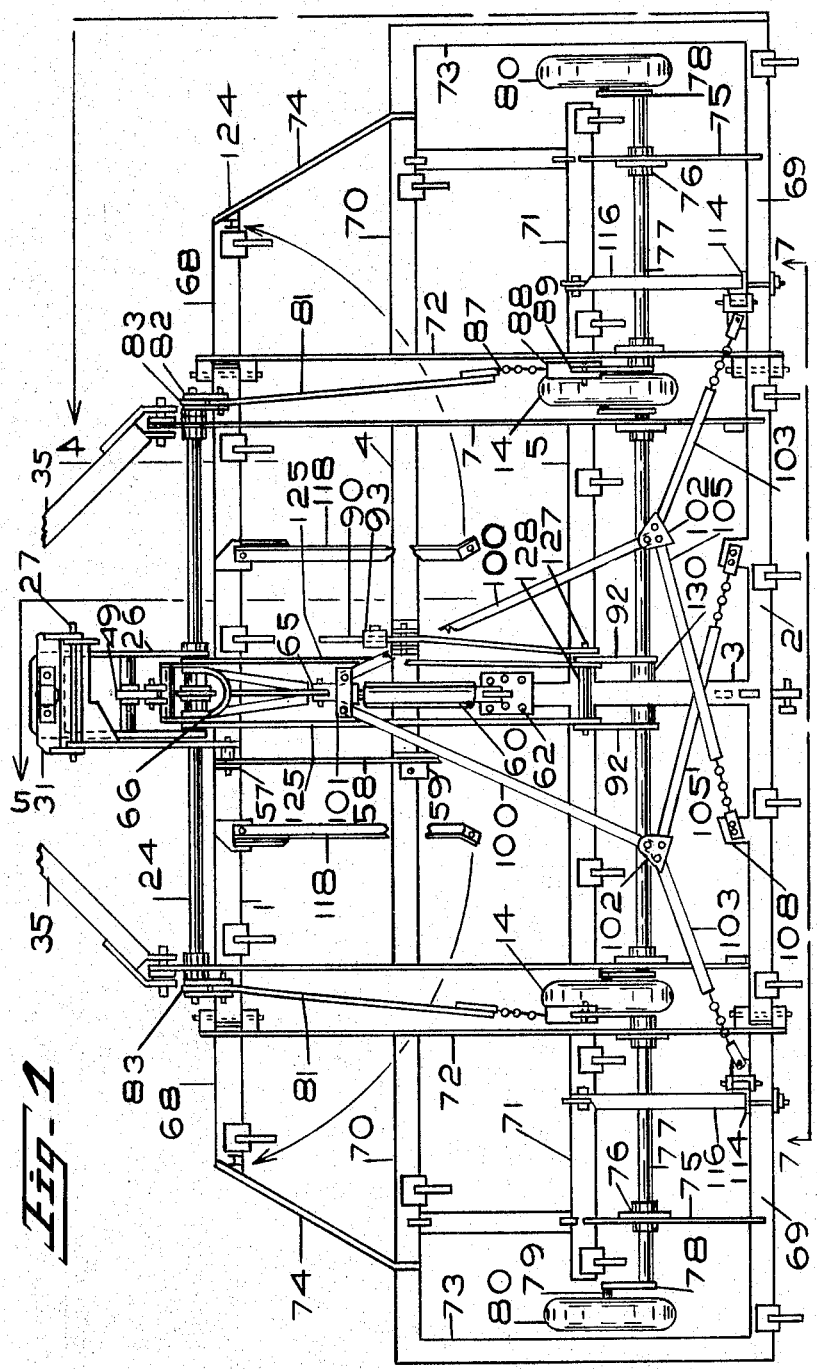

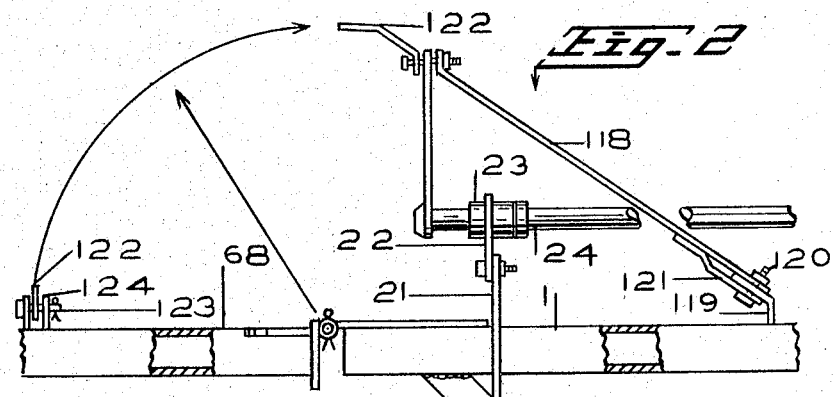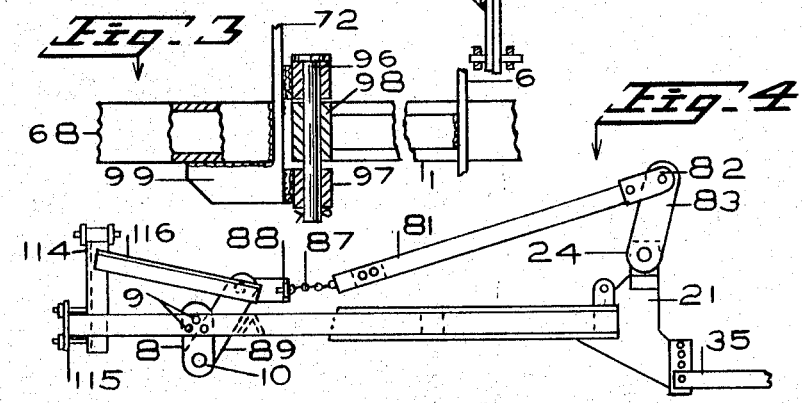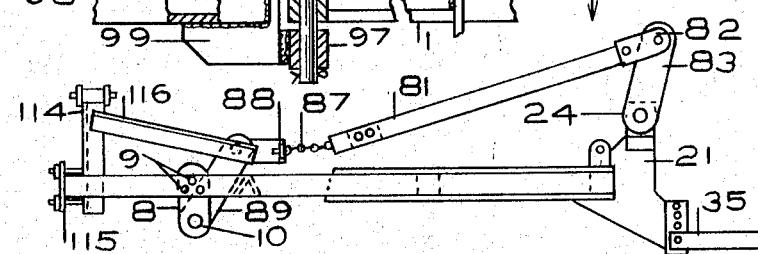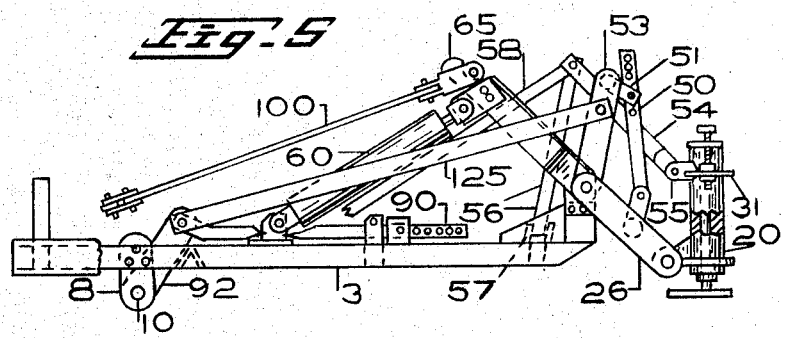

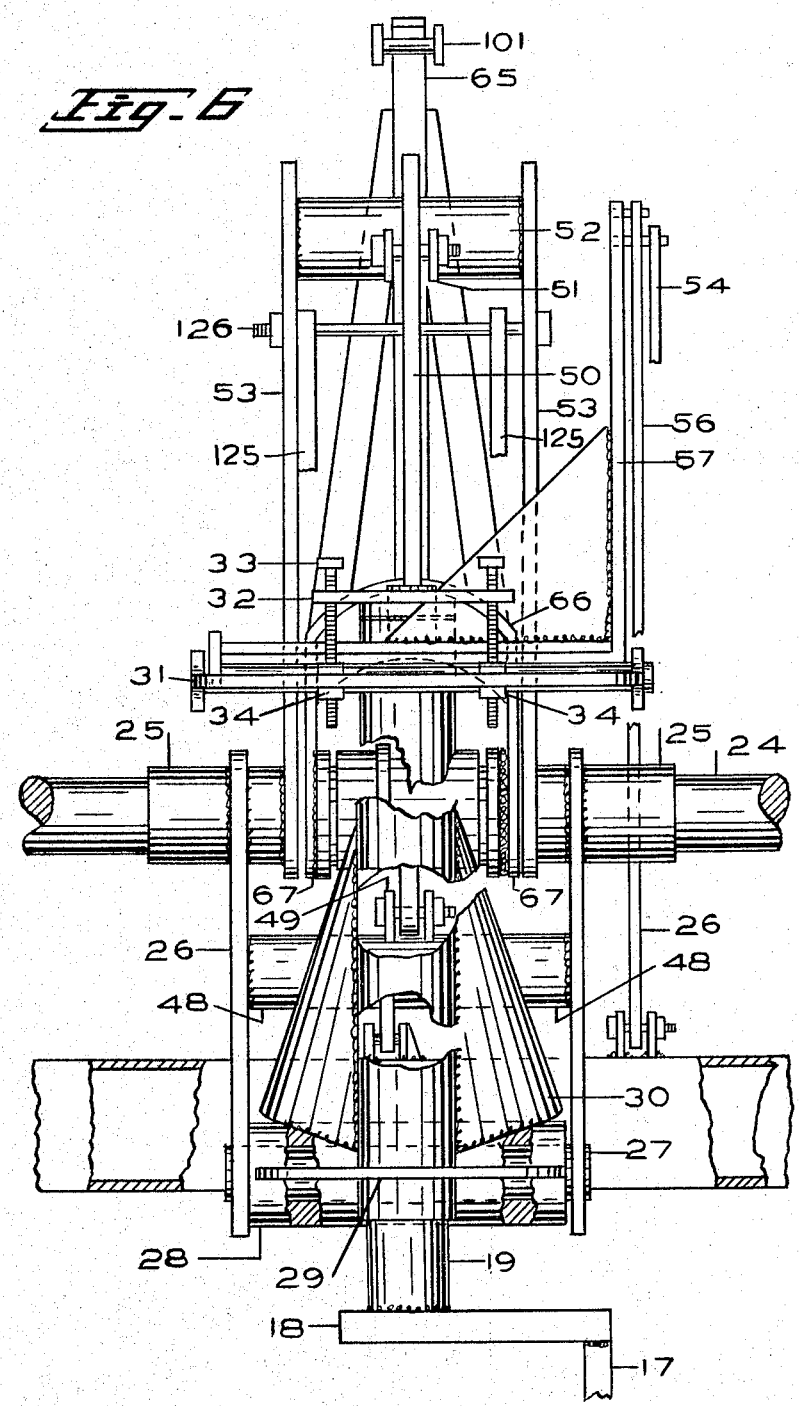

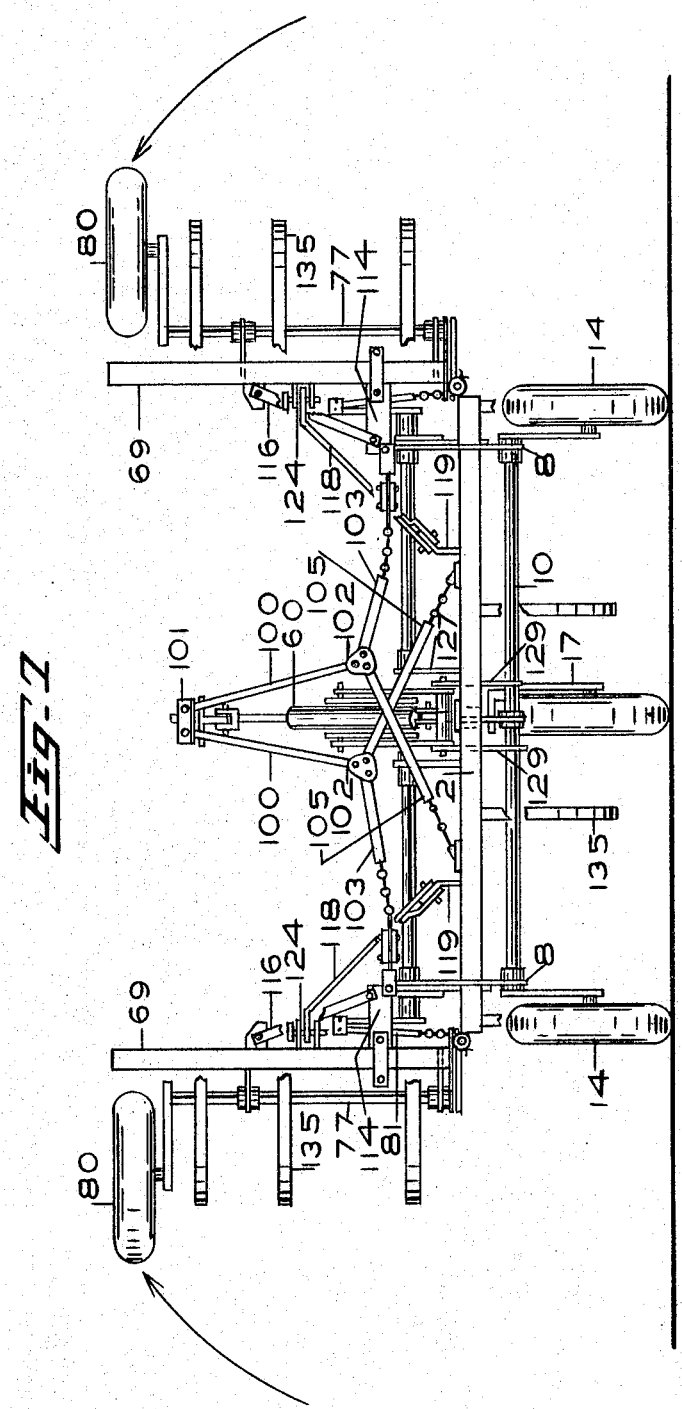

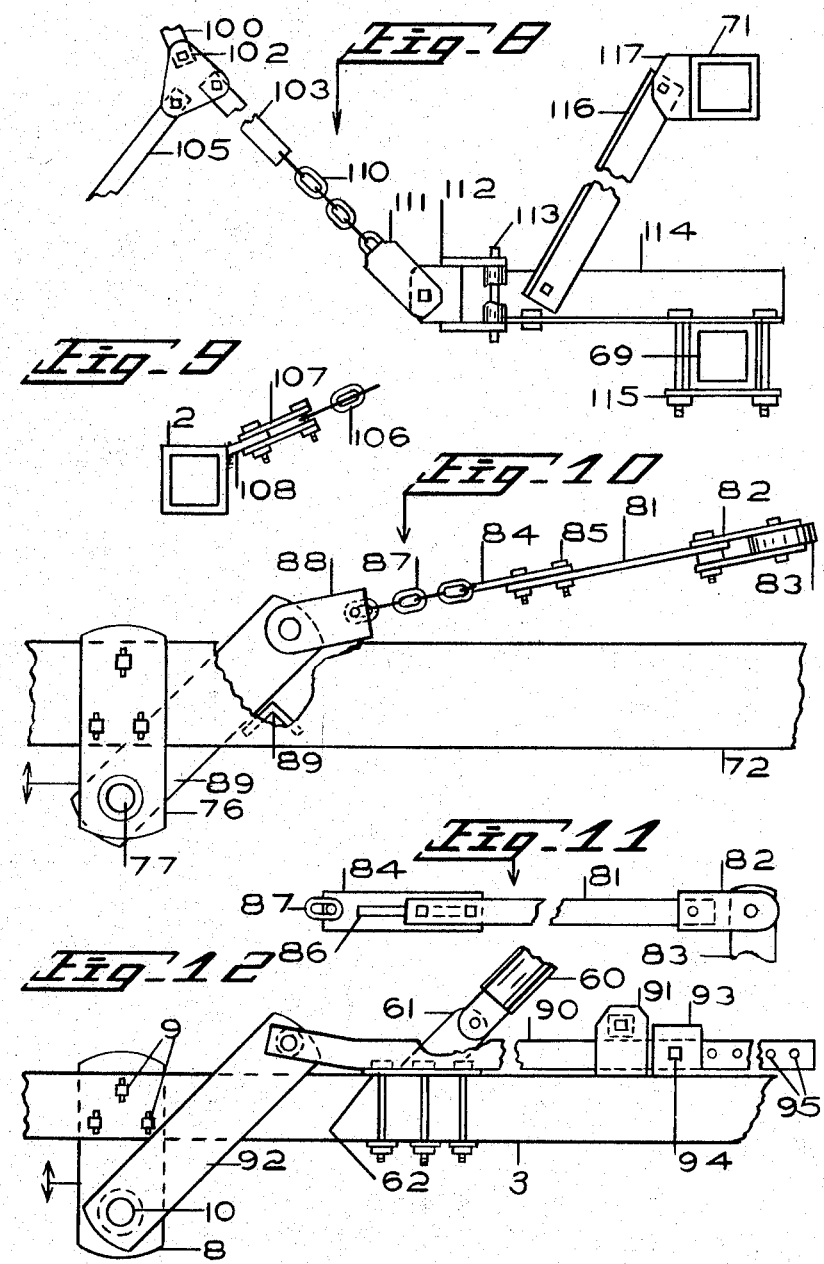

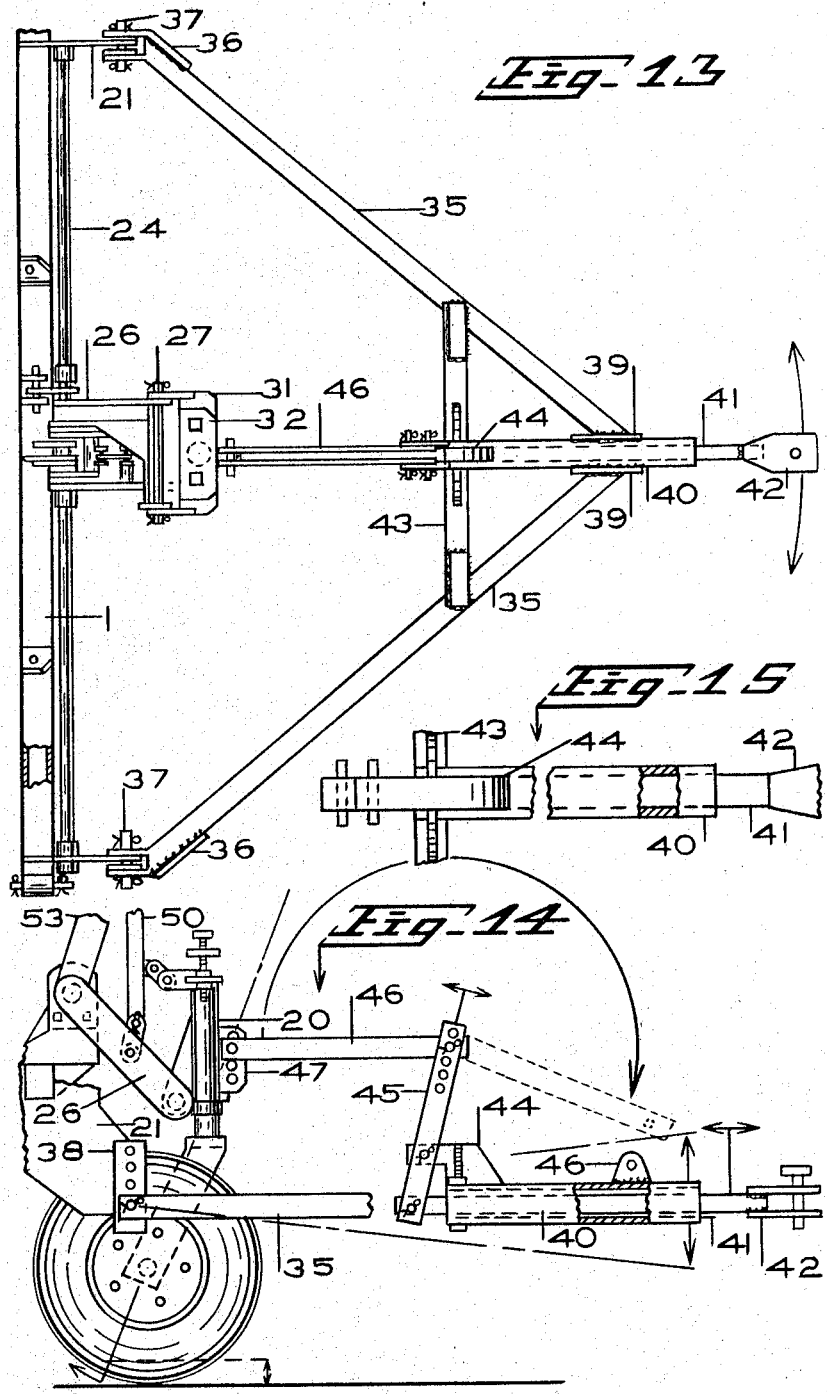

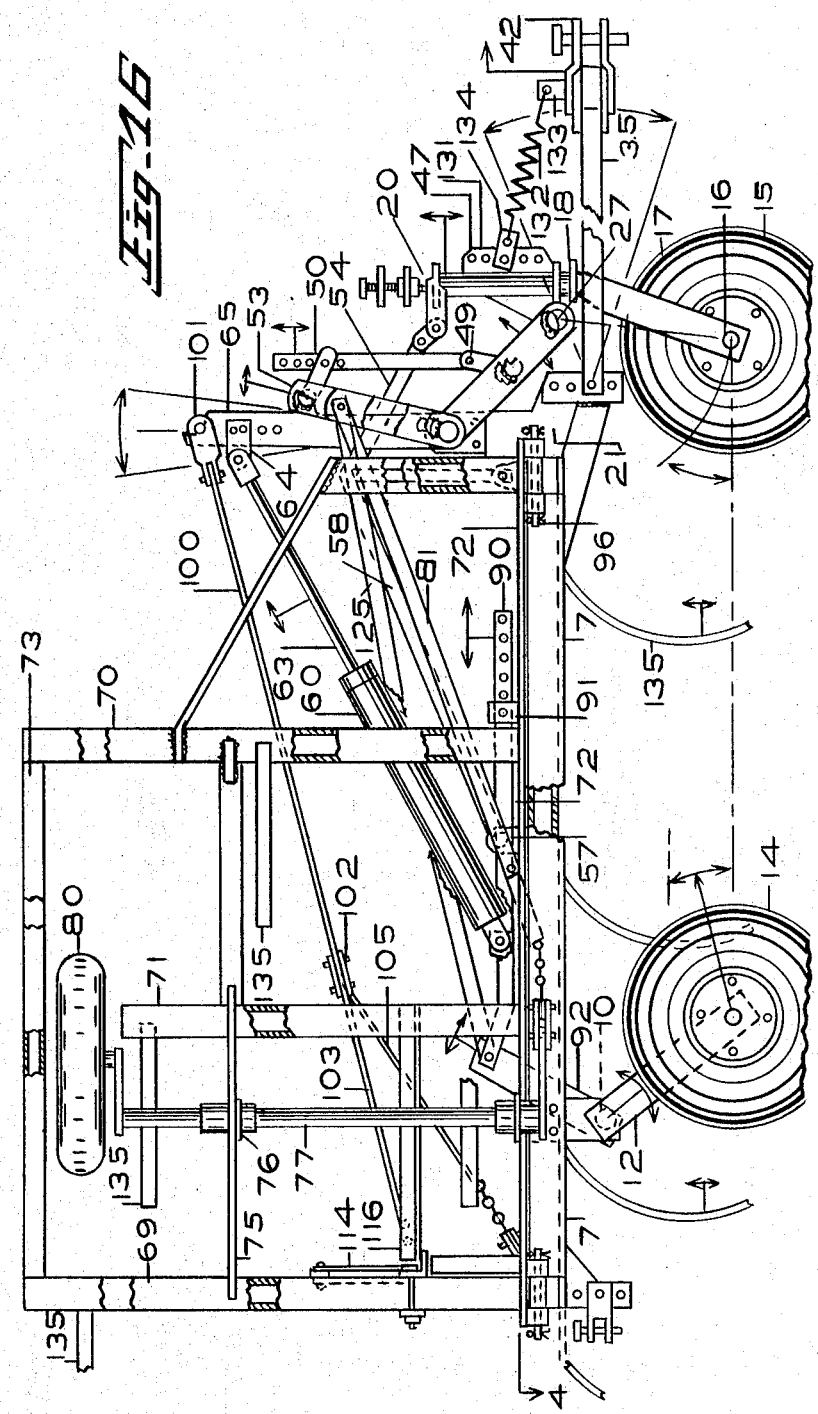

3,298,446
THREE SECTION DEEP TILLAGE CULTIVATOR
Peter Britanius Anderson, Box 40, Southey,
Saskatchewan, Canada
Filed Dec. 30, 1964, Ser. No. 422,324
1 Claim. (Cl. 172—456)

This invention relates to deep tillage cultivators, having particular reference to a three section implement.

In the art to which the invention relates, in order to obtain cultivators of greater width for use in farming large tracts of land, it is necessary to be able to reduce the overall width of the implement for road travel, and for this the implement is formed in sections connected together in line abreast for work and adjustable to reduce the width. This adjustment may be done by pivotally connecting the wing sections to be turned in following relation to a center section, or by having wing sections hinged to the center section and movable into a vertical position for travel. It is with this latter type that the present invention is concerned.

The implement as herein proposed has a main or center section to which are hinged two wing sections that move in line abreast with the center section for work, but may be turned upward and secured to the main section in a vertical position for travel. In this the wing sections are identical and are coupled forwardly and rearwardly to the center section, hydraulic means being employed for raising and lowering the wing sections, and for raising and lowering the implement as a unit.

The implement has the center section rearwardly supported on ground wheels and the wing sections outwardly similarly supported, and forwardly the center section is supported by a castor wheel. For raising and lowering the sections on their supporting wheels a novel arrangement is provided by which through a control shaft connected to be turned by the hydraulic element the center section is forwardly and rearwardly raised or lowered as a unit, and at the same time the wing sections are correspondingly raised and lowered on their supporting wheels, or by further connections the hydraulic element may be used to pivot the wing sections into a vertical position for travel of the implement on the road. It is in the means for transferring the power from the hydraulic element to the sections for raising and lowering the entire implement as a unit, and for moving the wing sections between vertical and horizontal positions that the present improvements are largely concerned.

The essential features and advantages of the improvements will become apparent by reference to the accompanying description taken in conjunction with the drawings.

In the drawings, where is illustrated a preferred embodiment of the invention,

FIG. 1 is a top plan view of the implement, shown with the wing sections lowered and in working position, parts of the implement being shown broken away and parts omitted for convenience of illustration.

FIG. 2 is an enlarged front view, broken away, of a fragmentary part of the implement showing hinge connected portions of the center and a wing section frames, and including the arm for securing the wing section in vertical position, and also the end portion of the control shaft and its mounting, shown with parts broken away and in part sectioned.

FIG. 3 is a top view of the front connected portions of the center and a wing section frames shown in FIGURE 2, illustrating a pivotal connection between the sections, with parts broken away and parts in section.

FIG. 4 is a detail side view of parts of the implement center section frame and the connections between the axle and control shafts, viewed from the line 4 of FIGURE 1.

FIG. 5 is a detail side view of parts of the center section, including the hydraulic element and the connections for turning the shafts for raising and lowering the implement as a whole and the wing sections.

FIG. 6 is an enlarged front view of the upper center portion of the implement, showing fragments of the control shaft and frame bar, and the connections for raising and lowering the implement frame and the wing sections, shown in part broken away and partly in section.

FIG. 7 is a rear view of the implement taken from the line 7—7 of FIGURE 1, but with wing sections raised for road travel, with parts broken away and parts omitted for convenience of illustration.

FIG. 8 is an enlarged top view of a fragment of a triangular lift connection for raising and lowering the wings and its attachment to a wing section frame, shown in parts broken away.

FIG. 9 is a detail end view of the rear center section frame bar and an anchoring attachment of a triangular lift connection to the frame bar, shown with the lift connection broken away.

FIG. 10 is an enlarged side view of a fragment of a center section side frame bar and the mounting of one end of the axle shaft, and including a reach bar with its connections to the axle shaft and the control shaft, showing parts as broken away.

FIG. 11 is a top view of the reach bar and its connection to the control shaft arm, with the reach bar shown broken away in parts.

FIG. 12 is an enlarged side view of a fragment of the center section intermediate frame bar with the axle shaft mounted thereon, and including the anchoring connection of the hydraulic element, showing the depth control bar mounted on the frame bar, with parts shown broken away.

FIG. 13 is a top plan view of the forward end portion of the implement and including the draft bars and drawbar, and the control shaft with its operating connections, with parts omitted for convenience of illustration.

FIG. 14 is a side view of the showing in FIGURE 13, with parts shown broken away and parts in section, and including the castor wheel.

FIG. 15 is a top plan view of the drawbar and clevis, and the sleeve in which the drawbar is mounted, shown partly broken away and including a fragment of the cross bar between the draft bars.

FIG. 16 is a side view of the implement shown with the wing sections raised for road travel, and with parts broken away and in parts sectioned.

Having reference to the drawings, the main frame of the implement center section (FIG. 1) includes front and rear cross frame bars 1 and 2 with an intermediate connecting bar 3, and including intermediate forward and rearward cross frame bars 4 and 5 that are connected, as by welding, to side frame plates 6 and 7, the side plates attaching to the front and the rear cross frame bars 1 and 2 inward of the ends thereof, leaving end portions of the cross frame bars 1 and 2 projecting outwardly of the side plates for attachment of the wing sections to the main frame.

To the frame side plates 6 and 7 are attached bearing plates 8 by pins 9 (FIGS. 4, 5 and 12), the bearing plates mounting an axle shaft 10 free to turn in bearings 11. The axle shaft has fixed to the ends thereof arms 12 (FIGS. 7 and 16) that are fixed to axle 13 on which wheels 4 are rotatable.

Forwardly the implement is supported by a caster wheel 15 rotatable on an axle 16 to which is fixed an arm 17 that is attached at its upper end to plate 18 on which is fixed a shaft 19 free to turn in a sleeve 20.

The side frame plates 6 and 7 include front connection plates 21 and to which are attached at their forward ends (FIG. 2) lugs 22 carrying bearing sleeves 23 that mount a control shaft 24 free to turn axially therein.

The control shaft has sleeves 25 fixed thereto (FIG. 6) to which are welded a pair of depending arms 26 that pivot on a shaft 27 carried by a spacer sleeve 28 that is welded to a flange plate 29 fixed to the sleeve 20 and reinforced by a brace shell 30.

Upward movement of the sleeve 20 on the shaft 19 is controlled by a plate 31 fixed to the sleeve in opposing relation to a plate 32 fixed on the upper end of the shaft. These plates are connected by bolts 33 threaded in the plate 32 and engaged by nuts 34—34, with the plate 31 between the nuts. This permits vertical adjustment of the sleeve for the depth adjustment of cultivator elements carried by the implement.

Referring to FIGURES 13, 14 and 15, converging draft bars 35 have couplings 36 on their rear ends that are pivotally attached by pins 37 to hitch plates 38 carried by the connection plates 21 of the frame plates 6 and 7, and are adjustable on said plates 38. Forwardly the draft bars 35 have plates 39 welded thereto and to a sleeve 40 in which is endwise slidable a drawbar 41 with tractor hitch 42. The draft bars 35 are forwardly braced by a cross bar 43 on which is fixed an upstanding plate 44. An equalizing draft arm 45 is pivoted to the rear end of the drawbar 41 and intermediately to the arm 44 (FIG. 14). The upper end of the draft arm 45 has pivotally attached thereto, vertically adjustable, a connecting bar 46 that pivotally attaches vertically adjustable to a hitch plate 47 fixed to the sleeve 20. When not in use the bar 46 may be disengaged from the plate 47 and attached to a lug 46' on the sleeve 40.

Between the arms 26 is fixed a tubular bar 48 (FIG. 6) to which are fixed lugs 49 that have a bar 50 pivotally attached thereto, this bar (FIG. 5) pivotally attaching, by adjustable holes, to lugs 51 pivoted on a tubular bar 52 (FIG. 6) fixed between the upper ends of a pair of arms 53 that are fixed to the sleeves 25 on the control shaft 24.

The sleeve 20 (FIG. 5) is anchored by a bar 54 pivoted to a lug 55 fixed to the plate 31 on the sleeve and rearwardly pivotally attached to an upright 56 that is attached to a lug 57 (FIG. 1) on the front frame bar 1 and braced by a bar 58 connected thereto and to a lug 59 on the frame cross bar 4.

For turning the control shaft 24 a hydraulic element 60 is used anchored by a lug 61 (FIGS. 12 and 16) to a plate 62 (FIGS. 1 and 12) bolted on the frame bar 3. Forwardly the hydraulic piston rod 63 (FIG. 16) pivotally attaches to a lug 64 that is attached, vertically adjustable, to an arm 65 (FIG. 6) with which are converging arms 65' that are integral with an arched plate 66 welded to collars 67 fixed to the control shaft 24.

To the center section of the implement are attached two wing sections, these being identical and similarly attached, and they are referred to by like numerals throughout.

Each of the wing sections includes a frame formed of front and rear cross frame bars 68 and 69 (FIG. 1) with intermediate cross frame bars 70 and 71. On the inside the cross frame bars are all connected by a side plate 72. On the outer side the frame bars 69 and 70 are connected by a frame bar 73, and the front frame bar 68, which is short, is connected by a side plate 74 to the frame bar 70.

Between the frame bar 71 and the rear cross frame bar 69 is attached a plate 75, and this plate with the side plate 72 carry bearing brackets 76 that mount an axle shaft 77 free to turn axially. This shaft, and the corresponding shaft 77 on the other wing section have fixed thereto arms 78 that are fixed to axles 79 on which are rotatable supporting wheels 80.

The shafts 77 align axially with the axle shaft 10 of the center section. For turning the wing section axle shafts 77 a pair of reach bars 81 (FIGS. 1, 4 and 10) pivotally attach forwardly by couplings 82 to upstanding arms 83 fixed to the ends of the control shaft 24. The reach bars have plates 84 (FIG. 10) attached thereto by bolts 85 that engage in slots 86, and chains 87 attach to the plates 84 and to lugs 88 on arms 89 fixed to the axle shaft 77.

For depth adjustment of the implement on the wheels 14 and 80 a control bar 90 (FIGS. 1, 5, 12 and 16) is mounted slidable in a lug 91 on the cross frame bar 4 and is pivotally attached at the rear end to the rod 127 fixed to the axle shaft 10 by arms 92. The control bar 90 has a block 93 attached thereto by a pin 94 engaging one or other of openings 95 in the control bar.

The wing sections attach to the center sections hinged thereto by couplings comprising pins 96 (FIGS. 1, 3 and 16) engaging sleeves 97 fixed to the side plates 72 of the wing section frames and sleeves 98 fixed to the extended end portions of the center section front and rear frame bars 1 and 2. The side plates 72 are braced at 99 (FIG. 3) to the frame bars 68 and 69.

For raising and lowering the wing sections pivoted on the center section between work and road travel positions link rods 100 (FIGS. 1, 7 and 16) are pivotally attached by a coupling 101 to the upper end of the arm 65, and to the rear ends of the link rods 100 are attached coupling plates 102 to which diverging rods 103 are attached for connection to the wing sections and anchoring rods 105 for connection to the center section frame.

The anchoring rods 105 (FIG. 9) connect by chains 106 and couplings 107 to upstanding lugs 108 on the rear frame bar 2, and the diverging rods 103 (FIGS. 1 and 8) attach by chains 110 to couplings 111 engaging lugs 112 that pivotally attach by pins 113 to angle bars 114 attached to the rear frame bars 69 of the wing sections by coupling bolts and plates 115, and braced by bars 116 fixed to the bars 114 and attached to lugs 117 fixed to the wing frame bars 71.

To attach the wing sections raised in position for travel, as in FIGURES 7 and 16, coupling bars 118 (FIG. 2) are pivotally attached to angled lugs 119 fixed to the frame bar 1 of the center section (FIG. 1) by pins 120 engaging the bars 118 and plates 121 thereon and the lugs 119, with the bars free to swing rearwardly, as in FIGURE 1, to an inoperative position resting on the frame bar 4 when not in use. The bars 118 have angled end portions 122 (FIG. 2) engageable by pins 123 with lugs 124 on the wing section front frame bars 68.

Raising and lowering the center section is done by the upstanding arms 53 (FIGS. 1, 5, 6, 7 and 16) that have attached thereto connecting bars 125 by a rod 126 (FIG. 6), these bars attaching to a cross rod 127 with spacer sleeve 128 (FIG. 1), the cross rod mounting in the upstanding radial arms 92 that attach to a sleeve 130 fixed on the axle shaft 10.

In the use of the implement, the center section is raised and lowered by the hydraulic element 60 (FIG. 16) which is connected by the bar 65 to the control shaft 24. This control shaft, by the bars 125 and arms 92 turns the axle shaft 10. At the same time the reach bars 81, that attach to the arms 83 on the ends of the control shaft 24 (FIG. 4) and are connected to the arms 89 fixed to the wing section axle shafts 77, turn the axle shafts, this combined movement of the axle shafts 10 and 77 raising or lowering the implement rearwardly on the supporting wheels 14 and 80 by the mounting of these wheels on the arms 12 of the wheels 14 and the arms 78 of the wheels 80.

When the control shaft 24 is turned to raise the rear end of the implement, at the same time by the connection of the arms 26 to the sleeve 20 the forward end of the implement is raised on the caster wheel 15.

For raising the wing sections into an elevated position, as in FIGURE 7, for travel, the hydraulic element by pushing back on the bar 65, which by the triangular assemblies (FIG. 1) made up of the rods 103, connecting plates 102 and the connections of the plates 102 to the angle bars 114 (FIG. 8) the wing sections are pulled up to a vertical position to where the bars 118 may be engaged with the lugs 124 on the wing section.

The draft connection for the implement, as shown in FIGURES 13 and 14, is through a drawbar 41 that has attached thereto a bar 45 connecting by a link 46 to the sleeve 20, so that when the drawbar is pulled forward by the tractor to which the implement is hitched the draft pushes rearwardly down against the implement, this being transmitted through the bars 54 and 58 (FIG. 5) to impose a downward pressure on the rear of the center section, as opposed to the normal upward pull of the drawbar and draft bars.

In FIGURE 16 is shown a spring 132 attached to a lug 134 that is engageable, as by a pin, to one or other of a series of openings 131 in the fin 47, the spring anchoring to a lug 133 on the clevis 42 for cushioning the rearward pressure on the sleeve 20.

For the implement to be raised for depth control the two reach bars 81 are adjusted lengthwise relative to the connection of the arms 65 to the wing sections such that raising and lowering the implement for depth control may be made without movement being imparted by the arm 65 through the rods 100 to the wing sections, for which the chains 110 and 106 would be slack an amount corresponding to the distance the implement may be raised in depth control. When the permissible limit of upward movement of the sections for depth control has been reached then the arms 65, 53 and 83 operate to raise the implement as a unit for road travel and at the same time elevate the wing sections to a vertical position, or a partial upward movement only may be made for field maneuvering. For this the rods 100 connect much farther up the bar 65 (FIG. 16) relative to the length of the arms 53 and 83 so that a longer movement is imparted to these rods than to the bars 125 and the reach bars 81.

What I claim is:

In an implement having a center section and a wing section hinged to each side of the center section; said center section having an axle shaft with radial arms fixed thereto and wheels mounted on axles and to which axles the radial arms are fixed; and said center section having a control shaft mounted to be turned axially and connected for turning the axle shaft axially and including hydraulic means anchored in the center section and connected for turning the control shaft by which the center section may be raised and lowered on its supporting wheels; mechanical means for simultaneously raising and lowering the outer ends of the wing sections; said mechanical means comprising axle shafts mounted to turn axially in the wing sections; radial arms fixed to the outer ends of the wing-section axle shafts; wheels mounted rotatable on axles and with the wing section axle shaft radial arms fixed to said latter axles; radial arms fixed to the inner ends of the wing section axle shafts; radial arms fixed to the outer ends of the control shaft; reach bars pivotally attached to the radial arms on the outer ends of the control shaft; means attaching the reach bars to the radial arms on the inner ends of the wing sections axle shafts; operable means for moving the wing sections between horizontal positions for work and vertical positions for road travel; said operable means including an upstanding arm fixed to the control shaft; a pair of link rods pivotally attached to the upstanding arm; linkage means connecting the free ends of the link rods to the wing sections for raising and lowering the wing sections by turning the control shaft; anchoring means connected to the link rods and anchored to the center section opposing the forwardly outward pull on the link rods in raising and lowering the wing sections; and the length of the reach bars adjustable relative to the length of the connections of the link rods to the wing sections by which initial movement of the control shaft when the implement wing sections are in position for work raises or lowers the center and wing sections for depth adjustment without any movement being imparted to the wing sections by the link rod connections therewith.

References Cited by the Examiner

UNITED STATES PATENTS

| 1,347,926 | 7/1920 | Andersen | 172—405 |
| 1,735,714 | 11/1929 | Altgelt | 172—417 X |
| 2,392,006 | 1/1946 | Silver | 172—406 X |
| 2,828,680 | 4/1958 | Johnson | 172—316 X |
| 2,981,344 | 4/1961 | Roberson | 172—417 X |
| 2,990,892 | 7/1961 | Bushmeyer et al. | 172—405 X |
| 3,195,652 | 7/1965 | Murray et al. | 172—414 |

FOREIGN PATENTS

| 687,645 | 6/1964 | Canada. |
| 1,016,043 | 10/1952 | France. |

ABRAHAM G. STONE, *Primary Examiner.*

J. R. OAKS, *Examiner.*